(12) United States Patent
Willis et al.

(10) Patent No.: US 9,451,072 B1
(45) Date of Patent: Sep. 20, 2016

(54) PHONE CALL MANAGEMENT BASED ON PRESENCE OF NEARBY PEOPLE

(71) Applicant: Motorola Mobility LLC, Chicago, IL (US)

(72) Inventors: Lawrence A Willis, Dubuque, IA (US); Gabriel B Burca, Palatine, IL (US); Aaron Dietrich, Geneva, IL (US); Justin Eltoft, Pleasant Prairie, WI (US); John J Gorsica, Round Lake, IL (US); John C Johnson, Spring Grove, IL (US); Thomas Merrell, Beach Park, IL (US); David P Winkler, Palatine, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/749,851

(22) Filed: Jun. 25, 2015

(51) Int. Cl.
*H04W 4/00* (2009.01)
*H04M 1/725* (2006.01)
*H04W 4/12* (2009.01)

(52) U.S. Cl.
CPC ........... *H04M 1/72519* (2013.01); *H04W 4/12* (2013.01); *H04M 2250/12* (2013.01)

(58) Field of Classification Search
None
See application file for complete search history.

(56) References Cited

U.S. PATENT DOCUMENTS

2014/0179227 A1* 6/2014 Nousiainen ........... H04W 84/18
455/41.2
2015/0304815 A1* 10/2015 Ghose ................... H04W 4/023
455/456.3

FOREIGN PATENT DOCUMENTS

EP 2182752 * 5/2010

* cited by examiner

*Primary Examiner* — Quan M Hua

(57) ABSTRACT

A phone call is made from an initiator phone to a receiver phone (200). The receiver phone determines how many people are near the receiver phone, and generates a response based on how many people are near the receiver phone. This response can be, for example, a message that is sent to the initiator phone and can be displayed at the initiator phone, indicating either that no one is near the receiver phone or that multiple people are near the receiver phone. The number of people that are near the receiver phone is monitored, and when just one person near the receiver phone is detected, various different actions can be taken. A message can be sent for display at the initiator phone indicating that there is only one person near the receiver phone, or the receiver phone can prompt the user to call back the initiator phone.

20 Claims, 6 Drawing Sheets

PHONE CALL MANAGEMENT BASED ON PRESENCE OF NEARBY PEOPLE

BACKGROUND

As technology has advanced, people have become increasingly reliant upon a variety of different devices, such as cellular or other wireless phones. Many people have even done away with their traditional land line phones, and rely entirely on their wireless phones for communication. While wireless phones offer a variety of different benefits, they are not without their problems. One such problem is that users may not be available to answer a phone call on their wireless phone, typically resulting in the phone just ringing and the caller getting routed to a voicemail system. This situation provides minimal information to both the caller and the person being called, which can lead to user dissatisfaction and frustration with their phones.

BRIEF DESCRIPTION OF THE DRAWINGS

Embodiments of user interface adaptation based on detected user location are described with reference to the following drawings. The same numbers are used throughout the drawings to reference like features and components.

DETAILED DESCRIPTION

Phone call management based on presence of nearby people is discussed herein. A phone call is made from one phone (e.g., an initiator phone) to another phone (e.g., a receiver phone). The receiver phone includes a call management system that determines how many people are near (e.g., within a threshold distance of) the receiver phone. This determination can be, for example, a determination that there is no one near the receiver phone, that there is only one person near the receiver phone, or that there are at least two people near the receiver phone.

When a phone call is received from the initiator phone, and the user of the receiver phone does not answer the phone call, a response is generated based on how many people are near the receiver phone. This response can be, for example, a message that is sent to the initiator phone and can be displayed at the initiator phone. The response indicates either that no one is near the receiver phone (if the determination was made by the call management system that no one is near the receiver phone) or that multiple people are near the receiver phone (if the determination was made by the call management system that at least two people are near the receiver phone). This response provides feedback to the caller, letting the caller know that the call was not answered because the person being called was not near his or her phone, or that the call was not answered because other people were near the person's phone and thus that he or she could not speak privately.

The call management system continues to monitor the number of people that are near the receiver phone, and detects when there is just one person near the receiver phone. In response to detecting that there is just one person near the receiver phone, various different actions can be taken. One action that can be taken is sending an indication to the initiator phone that there is only one person near the receiver phone, and an indication of such is displayed or otherwise presented to the caller. The caller can then determine whether he or she desires to place another phone call to the user of the receiver phone. Another action that can be taken is to display or otherwise present at the receiver phone an indication that a call was missed. This allows the user of the receiver phone to return the phone call, as he or she is presumably now alone and can speak in privacy. Voice recognition or other user credentials can optionally be used by the receiver phone to verify that the person attempting to return the phone call is indeed an authorized user of the receiver phone.

Figure 1:
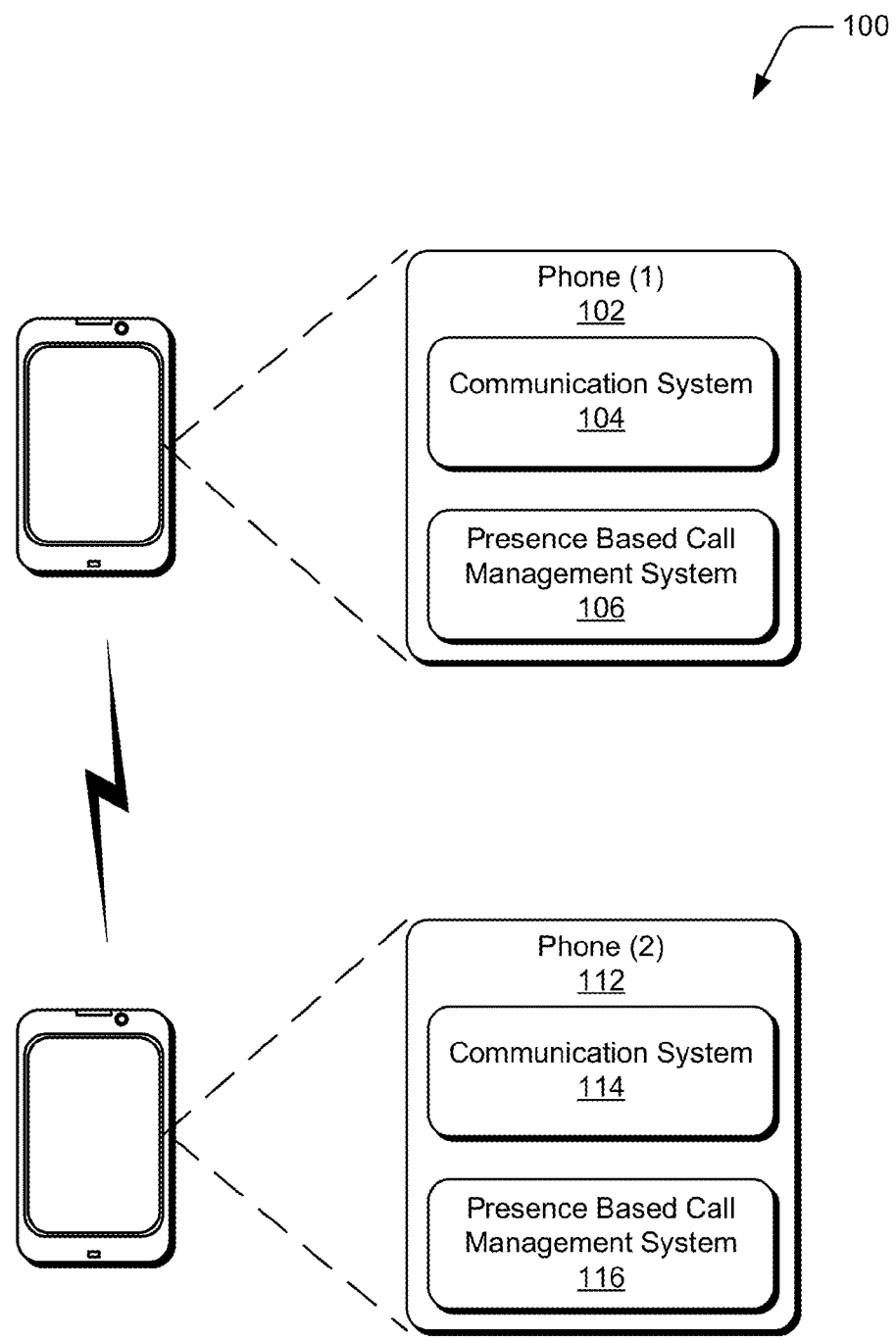
FIG. 1 illustrates an example system implementing the phone call management based on presence of nearby people discussed herein in accordance with one or more embodiments.

FIG. 1 illustrates an example system 100 implementing the phone call management based on presence of nearby people discussed herein in accordance with one or more embodiments. The system 100 includes a phone 102 that includes a communication system 104 and a presence based call management system 106. The system 100 also includes a phone 112 that includes a communication system 114 and a presence based call management system 116. One of the phones 102 and 112 operates as an initiator phone calling the other of the phones 102 and 112, which operates as a receiver phone. Which of phones 102 and 112 is the initiator phone and which is the receiver phone can change over time. It should be noted that although two phones are illustrated in the system 100, the system 100 can include any number of phones.

Each phone 102 and 112 can be any of a variety of different types of devices that support making and/or receiving phone calls, and the phones 102 and 112 can be the same or different types of devices. These devices can include devices typically thought of as a phone, as well as devices typically thought of as a computing device. For example, each phone 102 and 112 can be a handheld cellular or other wireless phone, a laptop computer, a tablet computer, a desktop computer, an entertainment device, and so forth. Each phone 102 and 112 can also be referred to as a computing device.

The communication system 104 represents functionality to allow phone calls to be initiated and/or received by the phone 102, and the communication system 114 represents functionality to allow phone calls to be initiated and/or received by the phone 112. The communication systems 104 and 114 can support communication using a variety of different communication technologies, such as 3G (third generation mobile communication technology), LTE (long term evolution) communication technology, PSTN (public switched telephone network) communication technology, VoIP (voice over internet protocol) communication technology, and so forth.

The presence based call management system 106 allows the phone 102 to operate as an initiator phone or a receiver phone. Similarly, the presence based call management system allows the phone 112 to operate as an initiator phone or a receiver phone. The presence based call management system 106 and 116 can communicate with the communication system 104 and 114, respectively to initiate a phone call to the other of the phones 102 and 112. The presence based call management system 106 and 116 can also determine how many people are near the phone 102 and 112, respectively, and provide an indication of such to an initiator phone as discussed in more detail below. The presence based call management system 106 and 116 can also facilitate callback to an initiator phone after the number of people near the phone 102 and 112, respectively, reaches one person, as discussed in more detail below.

Figure 2:
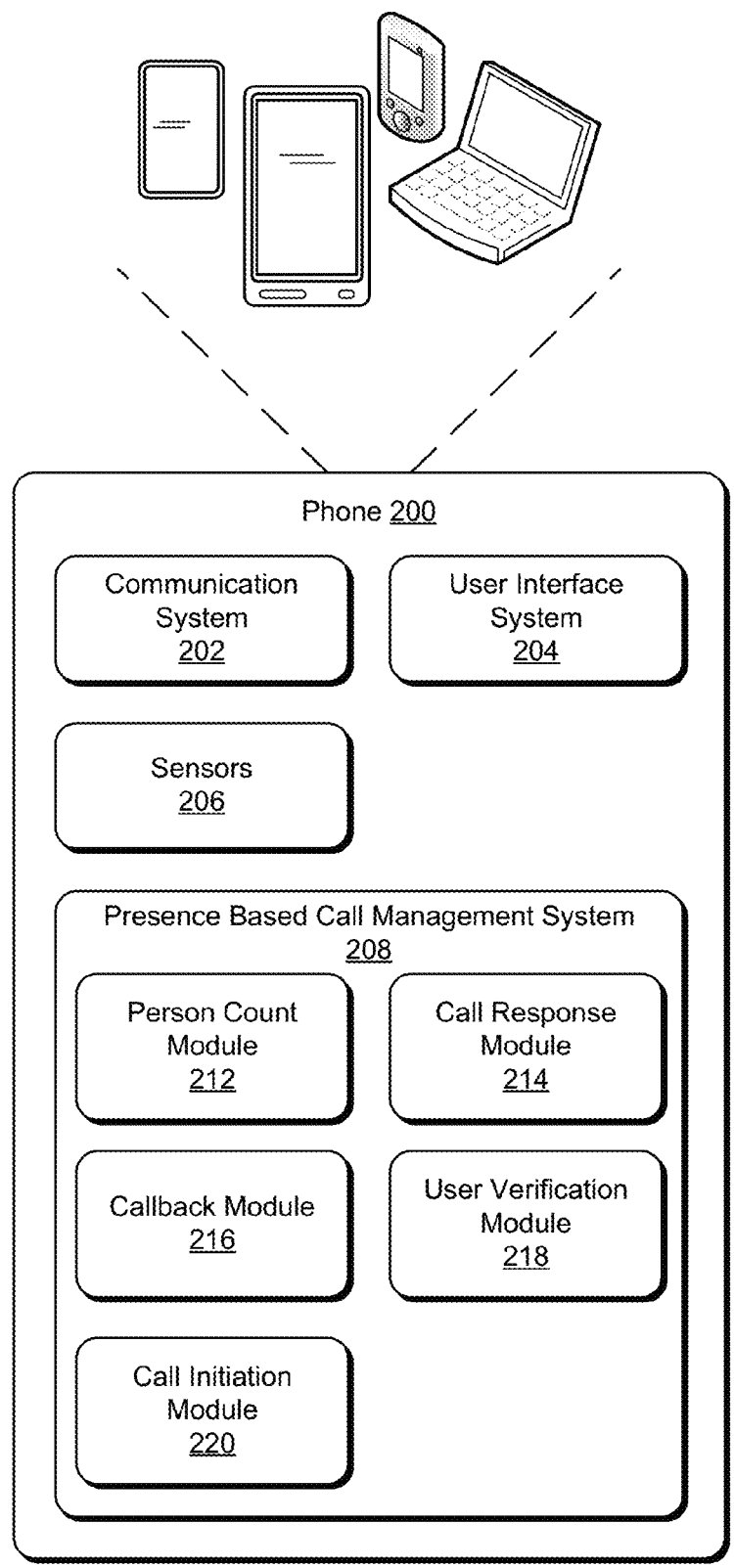
FIG. 2 illustrates an example phone in accordance with one or more embodiments.

FIG. 2 illustrates an example phone 200 in accordance with one or more embodiments. The phone 200 can be a phone 102 or 112 of FIG. 1, and each of the phones 102 and 112 of FIG. 1 can be a phone 200. The phone 200 includes a communication system 202, a user interface system 204, one or more sensors 206, and a presence based call management system 208. The communication system 200 represents functionality to allow phone calls to be initiated and/or received by the phone 200, analogous to the communication systems 104 and 114 of FIG. 1 discussed above.

The user interface presentation system 204 manages the presentation of a user interface on a display of the phone 200, including presenting content on the display as well as optionally presenting content on other devices (e.g., playing back audio content via a speaker coupled to the phone 200). Various different content can be presented on the display as part of the user interface, such as graphics (e.g., video or images), written words or other text, combinations thereof, and so forth. The content to be presented as part of the user interface can be received from various different modules, components, programs, and so forth of the phone 200.

The sensors 206 are one or more sensors that detect people near (in close physical proximity of) the phone 200. A user being near the phone 200 refers to the user being close enough to the phone 200 to be detected by at least one of the sensors 206, or to the user being within a threshold distance of the phone 200 (e.g., within 5 feet or 15 feet of the phone 200). Different sensors can have the ability to detect users at different ranges, thus the specific distance that is referred to as being near the phone 200 can vary based on the particular sensors 206.

The sensors 206 can include different types of sensors, including low energy (e.g., passive) sensors, higher energy sensors, or combinations thereof. In one or more embodiments, the sensors 206 include one or more motion sensors, such as infrared (IR) motion sensors. Alternatively, other types of motion sensors other than IR sensors can be used, such as ultrasonic motion sensors. Furthermore, the sensors 206 can include other types of sensors that are able to detect the presence of a user in the absence of motion (e.g., when the user is not moving). For example, the sensors 206 can include one or more IR passive sensors (e.g., heat sensors).

Additionally or alternatively, the sensors 206 can include one or more cameras or other imaging components. These cameras or other imaging components can capture images of the area surrounding the phone 200, which can be analyzed by various control components or modules of the phone 200 to detect users near the phone 200.

Furthermore, the sensors 206 can alternatively or additionally include one or more microphones. These microphones can sense sound waves in the area surrounding the phone 200, which can be analyzed by various control components or modules of the phone 200 to detect users near the phone 200.

The presence based call management system 208 includes a person count module 212, a call response module 214, a callback module 216, a user verification module 218, and a call initiation module 220.

The person count module 212 determines a count of people that are near the phone 200. The count of people that are near the phone 200 can be a number of people that are near the phone 200, or alternatively an indication that no one is near the phone 200, that only one person is near the phone 200, or at least two people are near the phone 200. The sensors 206 detect users near the phone 200, and can detect multiple different users concurrently. The manner in which multiple users are detected can vary based on the type of sensors 206, such as detecting the number of faces near the phone 200, detecting the number of different heat signatures (indicating different bodies) near the phone 200, and so forth. The person count module 212 receives an indication from the sensors 206 indicating detected people near the phone 200, and determines how many people are near the phone 200. The person count module 212 analyzes the information received from the sensors 206 and generates a count of people that are near the phone 200.

In one or more embodiments, the sensors 206 not only allow multiple people near the phone 200 to be detected, but also allow a particular person near the phone 200 to be detected. The information provided by the sensors 206 can be compared to known information regarding particular people (e.g., the owner or other user of the phone 200, people in a contacts list of the phone 200, people in a friends list of the user (e.g., a list on an online social networking service that the user of the phone 200 is part of) and so forth) and any of a variety of public and/or proprietary techniques can be used to identify particular people near the phone 200. If information for a person detected near the phone 200 matches (e.g., is the same as or is within a threshold amount of) known information for a particular person, then that person detected near the phone 200 is referred to as a known person. The count of people near the phone 200 can be based on whether the people near the phone 200 are known people. For example, the person count module 212 can generate a count of known people near the phone 200, a count of unknown people near the phone 200 (e.g., a total number of people detected near the phone 200 less the number of known people detected near the phone), and so forth.

The call response module 214 determines a response to provide to another phone in response to a call received from the other phone, and returns an indication of the response to the other phone. The response can be a response selected from previously generated responses that are stored or otherwise maintained by the call response module 214, or can be dynamically generated by the call response module 214. The response is determined based on the count of people near the phone 200 as determined by the person count module 212. The response is an indication of a number of people that are near the phone 200, as discussed in more detail below. The response can be sent in any of a variety of different manners, for example as a text message (e.g., using SMS (short message service) or MMS (multimedia messaging service)), as an email message, using other messaging or communication mechanisms, and so forth.

In one or more embodiments, the call response module 214 returns a response to another phone (an initiator phone) each time a phone call is received by the phone 200 from that other phone. Alternatively, the call response module 214 can return a response to the other phone (an initiator phone) only if certain criteria or conditions are satisfied. One or more of various different criteria or conditions can be used by the call response module 214 to determine whether such a response is to be returned to the other phone.

One such criteria or condition that can be implemented by the call response module 214 is a preference setting indicating whether a response is to be automatically returned to the other phone. The preference setting can be set in response to user input to the phone 200, allowing the user to specify whether a response is to be automatically returned to the other phone. If the preference setting indicates that a response is to be automatically returned to the other phone, then a response is automatically returned to the other phone. If the preference setting indicates that a response is not to be automatically returned to the other phone, then a response is not automatically returned to the other phone.

Another criteria or condition that can be implemented by the call response module 214 is whether a user input indicating to return a response is received at the phone 200. A notification of an incoming call can be presented at the phone 200, such as playing of a ringtone, displaying of an incoming call prompt, and so forth. Any of a variety of user inputs can be received at the phone 200 indicating to return a response to the other phone, such as user input selecting a button or icon on a display of the phone 200, user activation of a button or switch on the phone 200, user input of a gesture on a display of the phone 200, and so forth. If a user input is received at the phone 200 indicating that a response is to be returned to the other phone, then a response is returned to the other phone. If no such user input is received at the phone 200, then a response is not returned to the other phone.

Another criteria or condition that can be implemented by the call response module 214 is the identity of the caller. The identity of the caller can be determined in various manners, such as through caller id information received as part of the phone call. Different callers can be treated differently, with responses being provided to some callers but not to others. Which callers are to receive responses can be indicated by user input to the phone 200, such as the user indicating (e.g., as preferences or settings prior to receipt of the phone call) that particular people in his or her contacts list or address book of the phone 200 are to receive responses (but other people are not), the user indicating that anyone in his or her contacts list or address book of the phone 200 or in his or her friends list on a social network site is to receive responses (but other people are not), and so forth. If, based on the identity of the caller, a response is to be returned to the other phone, then a response is returned to the other phone. If, based on the identity of the caller, a response is not to be returned to the other phone, then a response is not returned to the other phone.

Another criteria or condition that can be implemented by the call response module 214 is whether one or more other events occur in response to an incoming phone call to the phone 200. These one or more other events can be the phone call not being answered (e.g., the caller hangs up before the user of the phone 200 answers the incoming call), a threshold amount of time elapsing after the incoming phone call is first received, and so forth. If the event occurs, then a response is returned to the other phone. If the event does not occur, then a response is not returned to the other phone.

The determined response is an indication of how many people are near the phone 200. In one or more embodiments, the indication is a count of people near the phone 200. Additionally or alternatively, the indication can be one of the following two indications: 1) that no one is near the phone 200 (e.g., the count of people near the phone is zero), or 2) that multiple people are near the phone 200 (e.g., the count of people near the phone is at least two). These indications, when received at the other phone (the initiator phone), can be displayed or otherwise presented at the other phone to notify the user of the other phone why the call was not answered. For example, an indication that no one is near the phone 200 notifies the user of the other phone that the phone call was not answered because the user was not near his or her phone 200. By way of another example, an indication that multiple people are near the phone 200 notifies the user of the other phone that the user of the phone 200 is not alone and thus cannot speak confidentially.

In one or more embodiments, the call response module 214 returns a response to the other phone (the initiator phone) only if the count of people near the phone 200 is zero, or if the count of people near the phone 200 is at least two. If the count of people near the phone 200 is one, then no response is returned to the other phone by the call response module 214.

Alternatively, the call response module 214 returns a response to the other phone (the initiator phone) only if the count of people near the phone 200 is zero, or if the count of unknown people near the phone 200 is at least one. The call response module 214 does not take into account the number of known people near the phone 200 because it is assumed that the user of the phone 200 is not concerned with speaking in the presence of the known people.

If a response is returned to the other phone (the initiator phone) indicating that the count of people near the phone 200 is zero, or at least two, then the person count module 212 continues to determine the number of people near the phone 200. The number of people near the phone 200 will change over time, as people approach the phone 200, as people move away from the phone 200, as the phone 200 is moved to different locations, and so forth. The callback module 216 monitors the count of people that are near the phone 200, and waits for the count of people that are near the phone 200 to be one. In response to the count of people near the phone being only one (optionally for at least a threshold amount of time, such as 30 seconds), the callback module 216 takes one or more actions.

In one or more embodiments, the action taken by the callback module 216 is to send a response to the other phone (the initiator phone) that the new count of people near the phone 200 is one. An indication of this response is displayed or otherwise presented at the other phone, notifying the user of the other phone that the user of the phone 200 is now near his or her phone (and is alone), if the user of the other phone desires to place another phone call to the user of the phone 200. The response can be sent to the other phone in a variety of different manners, analogous to the sending of the response to the other phone by the call response module 214.

Additionally or alternatively, the action taken by the callback module 216 is to display or otherwise present a prompt at the phone 200. This prompt notifies the user of the phone 200 that an incoming call was missed, and allows the user of the phone 200 to call back the initiator phone. The prompt optionally includes a callback option (e.g., a button or icon) that can be selected by the user of the phone 200 to make the callback to the other phone (from which the phone call was missed). In response to selection of the callback option, a callback phone call is initiated by the phone 200 (calling the other phone), with the phone 200 becoming the initiator phone for this callback phone call.

The user verification module 218 verifies the identity of the user of the phone 200. Various user authentication mechanisms can be used by the user verification module 218 to verify that the user is an authorized user of the phone 200, such as voice recognition, face or eye recognition, password or PIN (personal identification number) values, and so forth. The user verification module 218 maintains (e.g., in memory or storage device of the phone 200) information identifying one or more users that are authorized to use the phone 200, and checks the information input by or otherwise received from the user of the phone 200 against this maintained information. If the input or received information matches (e.g., is the same as) the maintained information, then the user is authenticated as authorized to use the phone 200. If the input or received information does not match (e.g., is not the same as) the maintained information, then the user is not authenticated as authorized to use the phone 200. In one or more embodiments, the callback module 216 performs the callback phone call in response to user selection of the callback option only if the user is authenticated as authorized to use the phone 200 by the user verification module 218.

The modules 212-218 provide various functionality when another phone is the initiator phone for a phone call to the phone 200. It should be noted that the phone 200 can also be the initiator phone for phone calls to other phones in which case the presence based call management system of another phone (a receiver phone) may return to the phone 200 indications of the number of people near the receiver phone. The call initiation module 220 manages responses received from such other phones when the phone 200 is the initiator phone. The call initiation module 200 optionally displays or otherwise presents the indication received from such other phones, allowing the user of the phone 200 to know if the user of the other phone is alone near the other phone.

Figure 3:
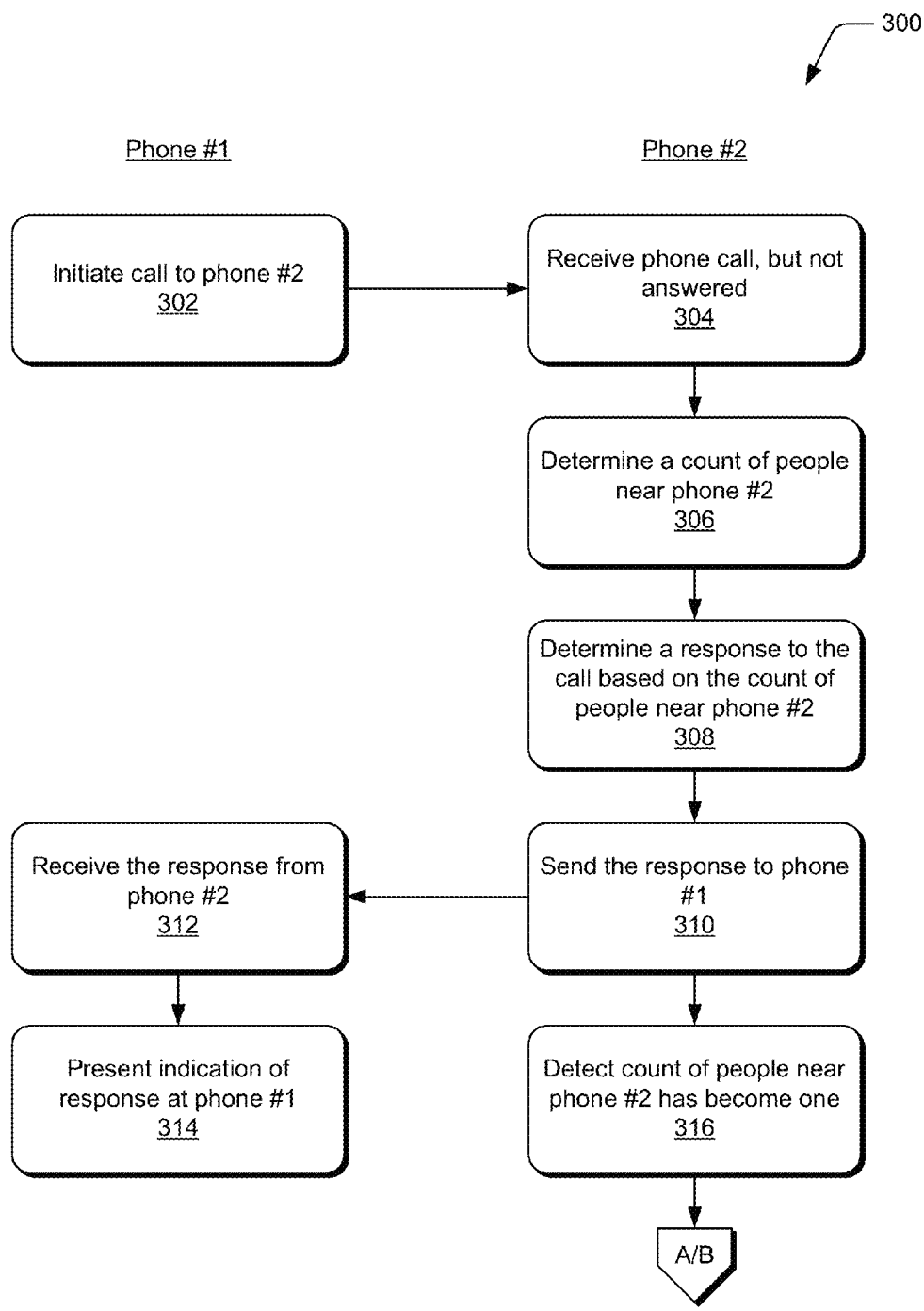
FIGS. 3, 4, and 5 illustrate example processes for implementing phone call management based on presence of nearby people in accordance with one or more embodiments.
Figure 4:
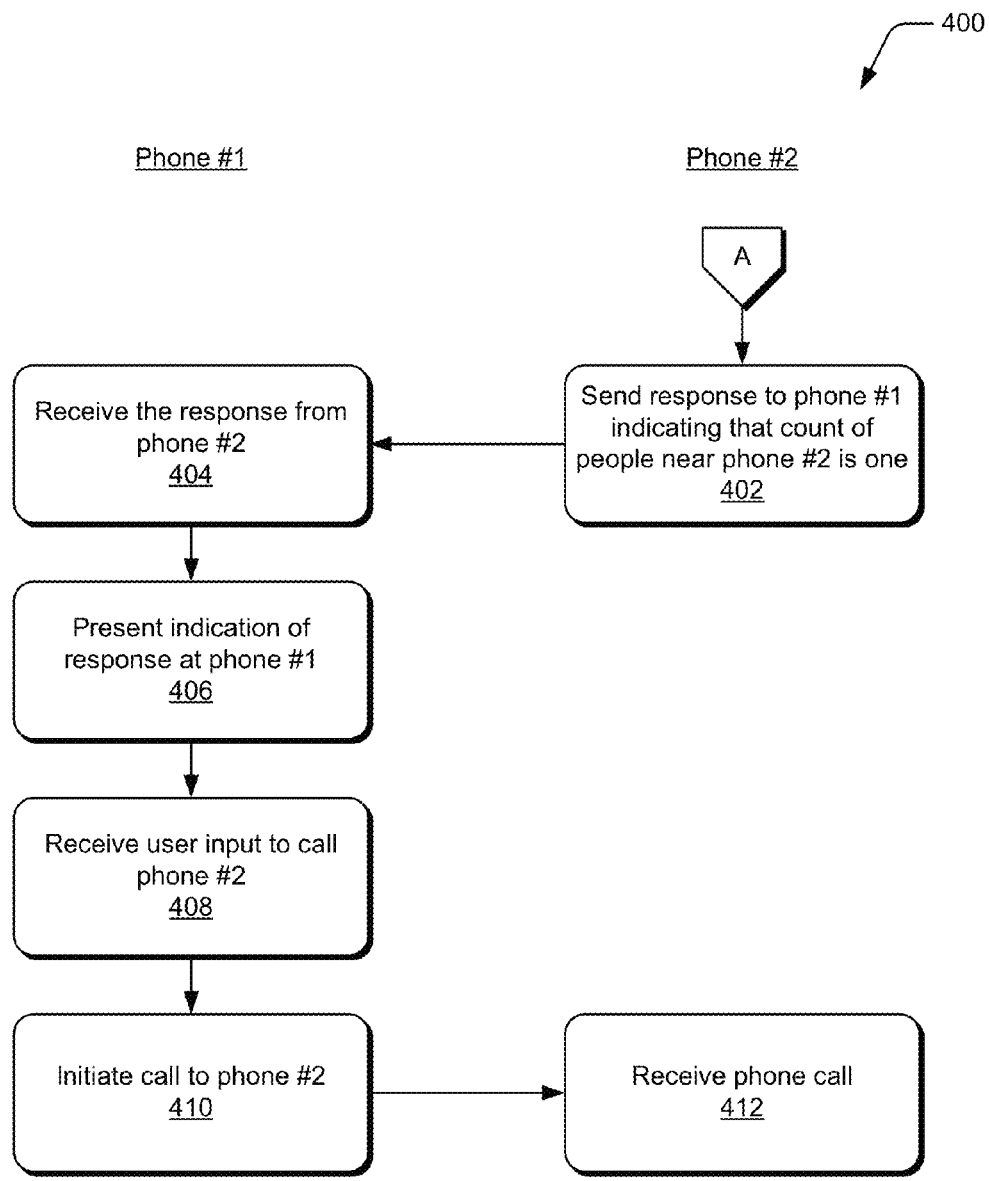
Figure 5:
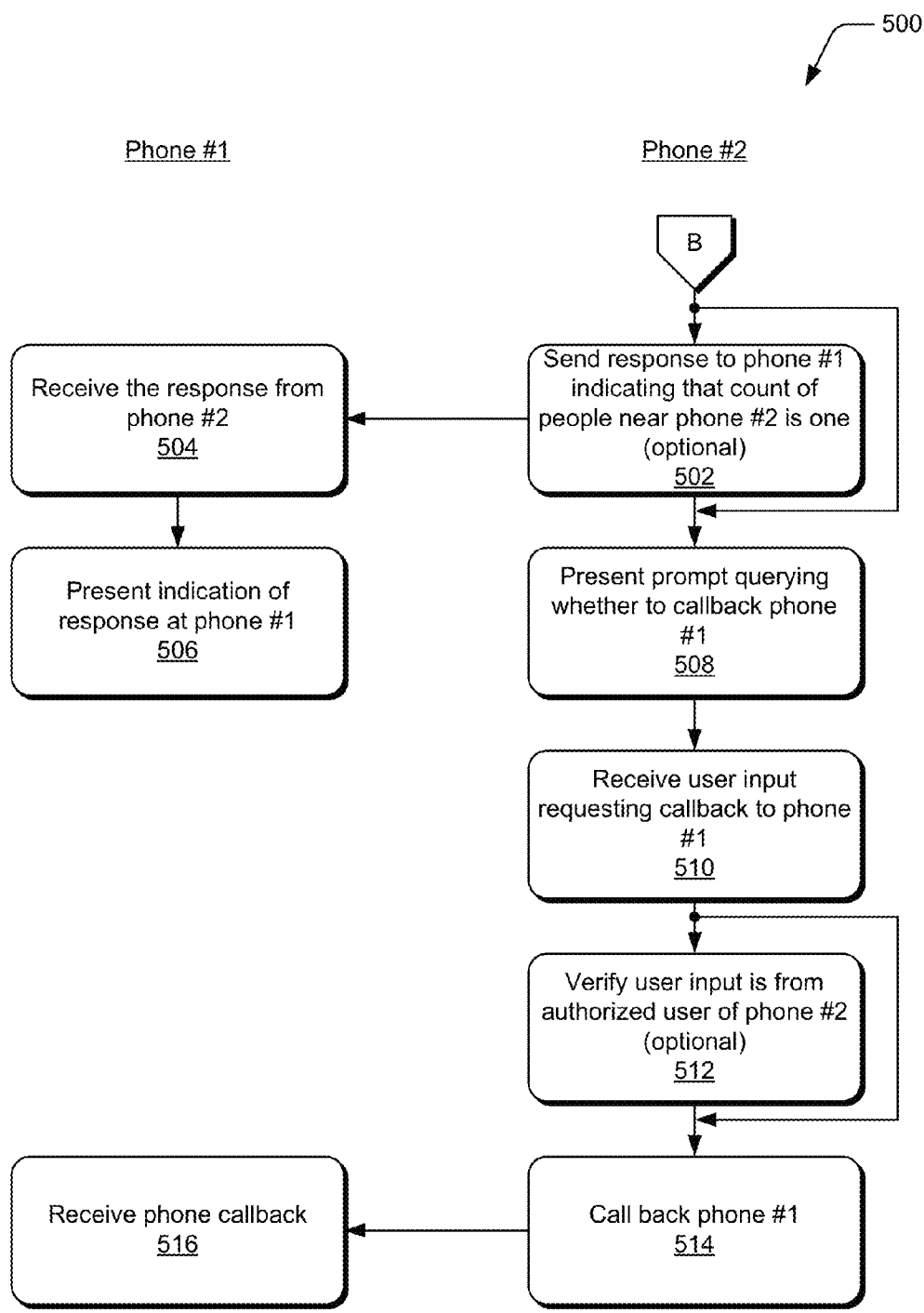

FIGS. 3, 4, and 5 illustrate example processes for implementing phone call management based on presence of nearby people in accordance with one or more embodiments. The illustrated processes are carried out at least in part by a phone such as the phone 102 or 104 of FIG. 1, or the phone 200 of FIG. 2, and can be implemented in software, firmware, hardware, or combinations thereof. Acts illustrated on the left-hand side of FIGS. 3, 4, and 5 are carried out by one phone (an initiator phone), and acts illustrated on the right-hand side of FIGS. 3, 4, and 5 are carried out by another phone (a receiver phone). The illustrated processes are shown as a set of acts and are not limited to the order shown for performing the operations of the various acts. The illustrated processes are example processes for implementing phone call management based on presence of nearby people; additional discussions of phone call management based on presence of nearby people are included herein with reference to different figures.

In process 300 of FIG. 3, one phone initiates a phone call to another phone (act 302). The phone initiating the phone call is also referred to as the initiator phone, and is discussed as phone #1 in FIGS. 3, 4, and 5. The phone being called is also referred to as the receiver phone, and is discussed as phone #2 in FIGS. 3, 4, and 5.

The incoming phone call is received at phone #2, but is not answered (act 304). In the illustrated example of FIG. 3, the process 300 proceeds in response to the phone call not being answered in act 304. However, various additional criteria or conditions can be used to determine whether the process 300 proceeds, such as a preference setting or user input, as discussed above.

A count of people near phone #2 is determined (act 306). The count of people can be determined using various detection techniques and information from various sensors, as discussed above.

A response to the received call is determined based on the count of people near phone #2 (act 308). Different responses can be determined in act 308, such as a response indicating that no one is near phone #2, or a response indicating that multiple people are near phone #2, as discussed above.

The determined response is sent to phone #1 (act 310), and received by phone #2 (act 312). An indication of the response is optionally displayed or otherwise presented at phone #1 (act 314), notifying the user of the content of the response.

Additionally, at phone #2 the count of people near phone #2 continues to be monitored, and the count of people near phone #2 becoming one is detected (act 316). This detection can optionally be the count of people near phone #2 becoming one and remaining one for some duration of time, rather than fluctuating between one and some other number(s), as discussed above.

In response to detecting the count of people near phone #2 becoming one, different actions can be taken. In one or more embodiments, the actions taken are illustrated as process 400 of FIG. 4. Alternatively, the actions taken are those illustrated as process 500 of FIG. 5.

In process 400 of FIG. 4, phone #2 sends a response to phone #1 indicating that the count of people near phone #2 is one (act 402). This response can be sent using a variety of different messaging or other communication mechanisms, as discussed above.

The response is received at phone #1 (act 404), and an indication of the response is displayed or otherwise presented at phone #1 (act 406). This indication is, for example, an indication to the user of phone #1 that the user of phone #2 is now near phone #2 and is alone.

A user input from the user of phone #1 is received, the user input indicating to call phone #2 (act 408). Another phone call (other than the phone call initiated in act 302 of FIG. 3) is initiated to phone #2 (act 410). The phone call is received at phone #2 (act 412), and whether the phone call is answered is at the discretion of the user of phone #2.

In process 500 of FIG. 5, phone #2 optionally sends a response to phone #1 indicating that the count of people near phone #2 is one (act 502). This response can be sent using a variety of different messaging or other communication mechanisms, as discussed above. If sent, the response is received at phone #1 (act 504), and an indication of the response is displayed or otherwise presented at phone #1 (act 506). This indication is, for example, an indication to the user of phone #1 that the user of phone #2 is now near phone #2 and is alone. It should be noted that act 502 (and thus acts 504 and 506) is optional and need not be performed.

Regardless of whether act 502 is performed, a prompt querying whether to callback phone #1 is displayed or otherwise presented (act 508). The prompt is displayed or otherwise presented at the phone #2 to obtain feedback from the user of phone #2 regarding whether to callback phone #1.

Process 500 proceeds assuming that user input requesting callback to phone #1 is received at phone #2 (act 510). Phone #2 optionally verifies that the user input is from an authorized user of phone #2 (act 512). This verification can be performed in various manners, such as voice recognition, face recognition, password, and so forth as discussed above.

In response to the user input being from an authorized user, or in response to the user input if no verification is performed, a callback to phone #1 is performed (act 514). A new phone call is initiated from phone #2 to phone #1. Accordingly, the phone call is received at phone #1 (act 516), and whether the phone call is answered is at the discretion of the user of phone #1. It should be noted, in response to this new phone call, the processes of FIGS. 3, 4, and 5 may be repeated, with phone #2 now being the initiator phone and phone #1 now being the receiver phone.

The techniques discussed herein support various different usage scenarios. For example, a husband may set his phone on the table at home and walk away, and his wife may call and get a response indicating that he is away from his phone. When the husband later returns to the table, his wife can be notified that he is near his phone so she can try calling him again, or he may be prompted to call back his wife. However, if a telemarketer calls the husband while he is away from the phone, the telemarketer would not be sent any response indicating that the husband is away from his phone.

By way of another example, a man may be at a party and be surrounded by multiple people when his mother calls him. His mother gets a response indicating that he is currently around a lot of people, letting her know that he presumably didn't answer his phone because he would not be able to talk to her privately. However, when he leaves the party, his mother can be notified that he is now alone so she can try calling him again, or he may be prompted to call back his mother.

Although various different individual modules and systems are discussed herein, it should be noted that multiple of these modules and systems can be combined into a single module or system, the functionality of one or more of the modules or systems can be implemented by another of the modules or systems, one or more of the modules or systems can be separated into multiple modules or systems, and so forth. The modules and systems can each be implemented in software, firmware, hardware, or combinations thereof.

Figure 6:
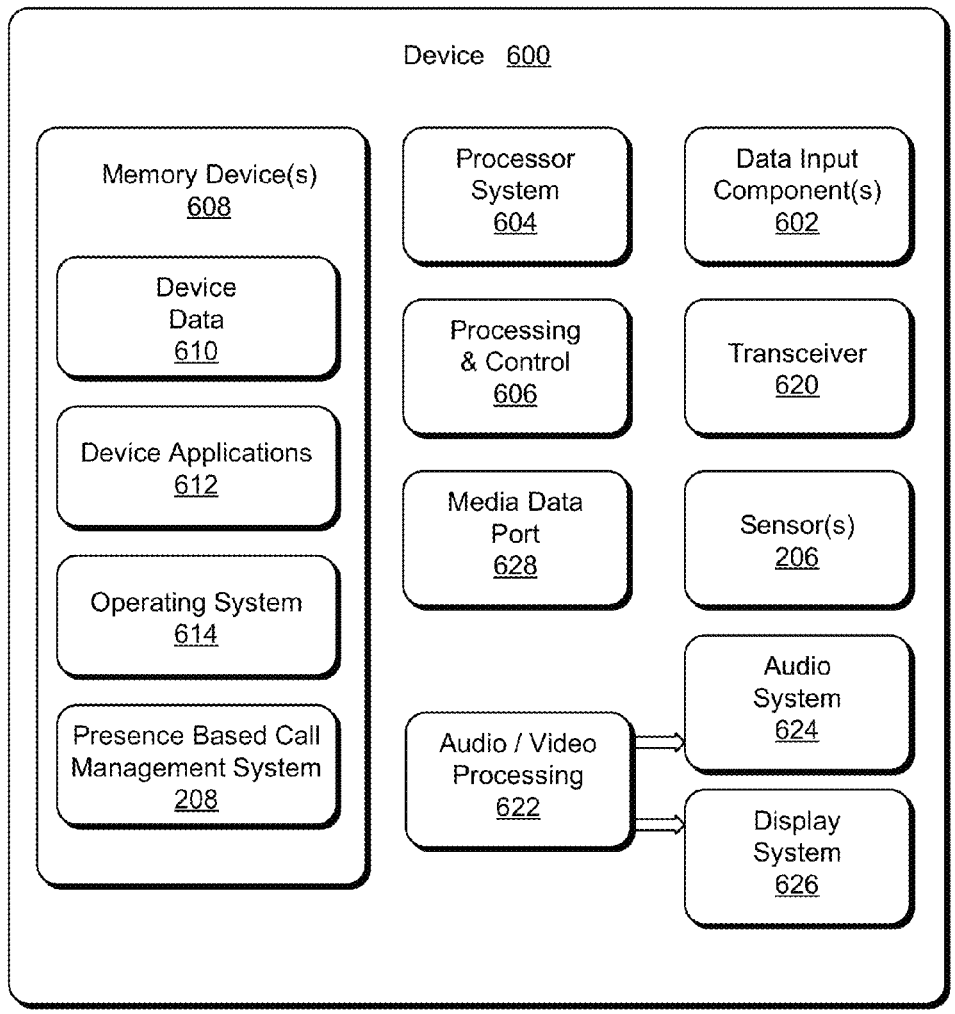
FIG. 6 illustrates an example electronic device that can implement embodiments of the techniques discussed herein.

FIG. 6 illustrates various components of an example electronic device 600 that can be implemented as a phone as described with reference to any of the previous FIGS. 1-5. The device 600 may be implemented as any one or combination of a fixed or mobile device in any form of a consumer, computer, portable, user, communication, phone, navigation, gaming, messaging, Web browsing, paging, media playback, or other type of electronic device such as a phone 102, 112, or 200 described above.

The electronic device 600 can include one or more data input components 602 via which any type of data, media content, or inputs can be received such as user-selectable inputs, messages, music, television content, recorded video content, and any other type of audio, video, or image data received from any content or data source. The data input components 602 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 602 may also include various other input components such as microphones, touch sensors, keyboards, and so forth.

The electronic device 600 of this example includes a processor system 604 (e.g., any of microprocessors, controllers, and the like) or a processor and memory system (e.g., implemented in a system on a chip), which processes computer executable instructions to control operation of the device 600. A processor system 604 may be implemented at least partially in hardware that can include components of an integrated circuit or on-chip system, an application specific integrated circuit, a field programmable gate array, a complex programmable logic device, and other implementations in silicon or other hardware. Alternatively or in addition, the electronic device 600 can be implemented with any one or combination of software, hardware, firmware, or fixed logic circuitry implemented in connection with processing and control circuits that are generally identified at 606. Although not shown, the electronic device 600 can include a system bus or data transfer system that couples the various components within the device 600. A system bus can include any one or combination of different bus structures such as a memory bus or memory controller, a peripheral bus, a universal serial bus, or a processor or local bus that utilizes any of a variety of bus architectures.

The electronic device 600 also includes one or more memory devices 608 that enable data storage such as random access memory, nonvolatile memory (e.g., read only memory, flash memory, erasable programmable read only memory, electrically erasable programmable read only memory, etc.), and a disk storage device. A memory device 608 provides data storage mechanisms to store the device data 610, other types of information or data (e.g., data backed up from other devices), and various device applications 612 (e.g., software applications). For example, an operating system 614 can be maintained as software instructions with a memory device and executed by the processor system 604.

In one or more embodiments the electronic device 600 includes a presence based call management system 208 and one or more sensors 206, described above. Although represented as a software implementation, modules of the presence based call management system 208 may be implemented as any form of a control application, software application, signal processing and control module, firmware that is installed on the device 600, a hardware implementation of the modules, and so on.

Moreover, in one or more embodiments the techniques discussed herein can be implemented as a computer-readable storage medium having computer readable code stored thereon for programming a computing device (for example, a processor of a computing device) to perform a method as discussed herein. Computer-readable storage media refers to media and/or devices that enable persistent and/or non-transitory storage of information in contrast to mere signal transmission, carrier waves, or signals per se. Computer-readable storage media refers to non-signal bearing media. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory.

The electronic device 600 also includes a transceiver 620 that supports wireless and/or wired communication with other devices or services allowing data and control information to be sent as well as received by the device 600. The transceiver 620 implements the communication systems 104, 114, and 202 discussed above. The wireless and/or wired communication can be supported using any of a variety of different public or proprietary communication networks or protocols such as cellular networks (e.g., third generation networks, fourth generation networks such as LTE networks), wireless local area networks such as Wi-Fi networks, and so forth.

The electronic device 600 can also include an audio or video processing system 622 that processes audio data or passes through the audio and video data to an audio system 624 or to a display system 626. The audio system or the display system may include any devices that process, display, or otherwise render audio, video, display, or image data. Display data and audio signals can be communicated to an audio component or to a display component via a radio frequency link, S-video link, high definition multimedia interface (HDMI), composite video link, component video link, digital video interface, analog audio connection, or other similar communication link, such as media data port 628. In implementations the audio system or the display system are external components to the electronic device. Alternatively or in addition, the display system can be an integrated component of the example electronic device, such as part of an integrated touch interface.

Although embodiments of techniques for user interface adaptation based on detected user location have been described in language specific to features or methods, the subject of the appended claims is not necessarily limited to the specific features or methods described. Rather, the specific features and methods are disclosed as example implementations of techniques for user interface adaptation based on detected user location.

What is claimed is:

1. A method implemented in a first phone, the method comprising:
   receiving, from a second phone, an incoming call;
   obtaining a count of people that are near the first phone;
   determining, based on the count of people near the first phone, a response to provide to the second phone in response to the incoming call; and
   sending the response to the second phone;
   determining, after providing the response to the second phone, a new count of people that are near the first phone; and
   sending, to the second phone based on the new count of people that are near the first phone, a message indicating that a user of the first phone may speak in privacy at the first phone.

2. The method of claim 1, the count of people comprising zero people, and the response comprising an indication that zero people are near the first phone.

3. The method of claim 2, the response comprising a text message.

4. The method of claim 1, the count of people comprising two or more people, and the response comprising an indication that multiple people are near the first phone.

5. The method of claim 4, the response comprising a text message.

6. The method of claim 1, the new count of people comprising only one person, the message comprising a message indicating that a user of the first phone is alone at the first phone, and the sending comprising
   sending, to the second phone in response to the new count of people comprising only one person, the message indicating that a user of the first phone is alone at the first phone.

7. The method of claim 1, the method further comprising:
   presenting, at the first phone, a prompt querying whether a callback to the second phone is to be made;
   receiving a user input indicating to make the callback to the second phone; and
   initiating, in response to the user input, the callback to the second phone.

8. The method of claim 7, the method further comprising:
   checking whether a user from which the user input is received is an authorized user of the first phone; and
   initiating the callback to the second phone only if the user is an authorized user of the first phone.

9. The method of claim 1, the count of people comprising at least two people, the method further comprising checking whether each of the at least two people are known people, and the response comprising a message indicating that multiple people are near the first phone if there is at least one unknown person near the phone.

10. The method of claim 9, each of the known people comprising a user of the phone, a person in a contacts list of the phone, or a person in a friends list of the user.

11. The method of claim 1, further comprising:
   determining an identity of a caller that initiated the incoming call;
   determining whether the caller is a person that is to receive responses from the first phone; and
   sending the response to the second phone only if the caller is a person that is to receive responses from the first phone.

12. A method implemented in an initiator phone, the method comprising:
   initiating a phone call to an additional phone;
   receiving, from the additional phone, a first response indicating that a count of people near the additional phone is either zero people or at least two people;
   receiving, from the additional phone after receipt of the first response, a second response indicating that a new count of people near the additional phone is only one person; and
   presenting, at the initiator phone, an indication that a user of the additional phone is alone and near the additional phone.

13. The method of claim 12, the first response indicating that the count of people near the additional phone is zero people, and the method further comprising displaying, in response to receipt of the first response, an indication that no one is near the additional phone.

14. The method of claim 12, the first response indicating that the count of people near the additional phone is at least two people, and the method further comprising displaying, in response to receipt of the first response, an indication that multiple people are near the additional phone.

15. A first phone comprising:
   one or more sensors configured to determine how many people are near the first phone; and
   a presence based call management system configured to receive a call from a second phone, obtain a count of people that are near the first phone, determine a response based on the count of people near the first phone to provide to the second phone in response to the incoming call, and send the response to the second phone, the presence based call management system being further configured to:
      determine, after providing the response to the second phone, a new count of people that are near the first phone;
      present, at the first phone, a prompt querying whether a callback to the second phone is to be made;
      receive a user input indicating to make the callback to the second phone; and
      initiate, in response to the user input, the callback to the second phone.

16. The first phone of claim 15, the count of people comprising zero people, and the response comprising an indication that zero people are near the first phone.

17. The first phone of claim 15, the count of people comprising two or more people, and the response comprising an indication that multiple people are near the first phone.

18. The first phone of claim 15, the presence based call management system being further configured to:
   determine an identity of a caller that initiated the call;
   determine whether the caller is a person that is to receive responses from the first phone; and send the response to the second phone only if the caller is a person that is to receive responses from the first phone.

19. The first phone of claim 15, the new count of people comprising only one person, and the presence based call management system being further configured to:
   send, to the second phone in response to the new count of people comprising only one person, a message indicating that a user of the first phone is alone at the first phone.

20. The first phone of claim 15, the new count of people comprising only one person.

\* \* \* \* \*